(12) United States Patent
Cook et al.

(10) Patent No.: US 9,117,450 B2
(45) Date of Patent: Aug. 25, 2015

(54) COMBINING RE-SPEAKING, PARTIAL AGENT TRANSCRIPTION AND ASR FOR IMPROVED ACCURACY / HUMAN GUIDED ASR

(71) Applicant: Nuance Communications, Inc., Burlington, MA (US)

(72) Inventors: Gary David Cook, Suffolk (GB); William F. Ganong, III, Brookline, MA (US); Andrew Johnathon Daborn, Berkshire (GB)

(73) Assignee: Nuance Communications, Inc., Burlington, MA (US)

( * ) Notice: Subject to any disclaimer, the term of this patent is extended or adjusted under 35 U.S.C. 154(b) by 217 days.

(21) Appl. No.: 13/712,032

(22) Filed: Dec. 12, 2012

(65) Prior Publication Data
US 2014/0163981 A1    Jun. 12, 2014

(51) Int. Cl.
*G10L 15/26* (2006.01)
*G10L 15/22* (2006.01)
*G10L 15/32* (2013.01)

(52) U.S. Cl.
CPC .......... *G10L 15/26* (2013.01); *G10L 15/32* (2013.01); *G10L 2015/221* (2013.01)

(58) Field of Classification Search
CPC ........................................................ G10L 15/26
USPC ................................................................ 704/235
See application file for complete search history.

(56) References Cited

U.S. PATENT DOCUMENTS

| 5,794,189 | A | 8/1998 | Gould |
| 6,167,377 | A | 12/2000 | Gillick et al. |
| 7,403,941 | B2 * | 7/2008 | Bedworth et al. ............ 1/1 |
| 8,352,269 | B2 * | 1/2013 | Kurzweil et al. .......... 704/258 |
| 8,676,577 | B2 * | 3/2014 | Jablokov et al. .......... 704/235 |
| 8,793,122 | B2 * | 7/2014 | White et al. .............. 704/9 |

* cited by examiner

*Primary Examiner* — Susan McFadden
(74) *Attorney, Agent, or Firm* — Mark H. Whittenberger, Esq.; Holland & Knight LLP

(57) ABSTRACT

A speech transcription system is described for producing a representative transcription text from one or more different audio signals representing one or more different speakers participating in a speech session. A preliminary transcription module develops a preliminary transcription of the speech session using automatic speech recognition having a preliminary recognition accuracy performance. A speech selection module enables user selection of one or more portions of the preliminary transcription to receive higher accuracy transcription processing. A final transcription module is responsive to the user selection for developing a final transcription output for the speech session having a final recognition accuracy performance for the selected one or more portions which is higher than the preliminary recognition accuracy performance.

10 Claims, 6 Drawing Sheets

COMBINING RE-SPEAKING, PARTIAL AGENT TRANSCRIPTION AND ASR FOR IMPROVED ACCURACY / HUMAN GUIDED ASR

TECHNICAL FIELD

The present invention relates to human supervised automatic transcription of speech in real time.

BACKGROUND ART

An automatic speech recognition (ASR) system determines a representative text output for an unknown speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\operatorname{argmax}} P(W \mid A)$$

Given a system of statistical acoustic models, this formula can be re-expressed as:

$$\hat{W} = \underset{W}{\operatorname{argmax}} P(W) P(A \mid W)$$

where P(A|W) corresponds to the acoustic models and P(W) reflects the prior probability of the word sequence as provided by a statistical language model reflecting the probability of given word in the recognition vocabulary occurring.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

One specific application of ASR technology is for automatic transcription of real-world audio from speech sessions with multiple different speakers such as teleconferences, meeting records, police interviews, etc. There appears to be a large commercial market for accurate but inexpensive automatic transcription of such speech sessions. In many specific contexts the combination of the acoustic conditions and the speaking styles mean that current state-of-the-art ASR technology is unable to provide an accurate transcription. Manual transcriptions by human agents are generally very slow and expensive to obtain because of the time required—human agents typically need to listen to the audio many times.

SUMMARY

Embodiments of the present invention are directed to a speech transcription system for producing a representative transcription text from one or more different audio signals representing one or more different speakers participating in a speech session. A preliminary transcription module develops a preliminary transcription of the speech session using automatic speech recognition having a preliminary recognition accuracy performance A speech selection module is for user selection of one or more portions of the preliminary transcription to receive higher accuracy transcription processing. A final transcription module is responsive to the user selection for developing a final transcription output for the speech session having a final recognition accuracy performance for the selected one or more portions which is higher than the preliminary recognition accuracy performance.

In further specific embodiments, the preliminary transcription module may develop the preliminary transcription automatically and/or with human assistance. The speech selection module may make the user selection based on one more specified selection rules and/or by manual user selection. The final transcription module may use manual transcription or automatic speech recognition for developing the final transcription output. When the final transcription module uses automatic speech recognition, it may specifically use transcription models adapted from information developed by the preliminary transcription module, which also may be adapted from one or more different speakers. In some embodiments, there may be multiple different audio signals representing multiple different speakers.

Embodiments of the present invention also include a speech transcription system for producing a representative transcription text from one or more different audio signals representing one or more different speakers participating in a speech session. A keyword transcript module provides for real time processing of one or more speech signals by a human agent to generate a partial transcript of keywords. A transcript alignment module time aligns the partial transcript with the one or more speech signals. A speech transcription module performs automatic speech recognition of the one or more speech signals as constrained by the time aligned partial transcript to produce a final transcription output containing the keywords.

In further specific embodiments, an ASR support module provides ASR processing of the one or more speech signals in real time to support the human agent while generating the partial transcript. For example, the ASR support module may include one or more language models for predicting likely words in the one or more speech signals for the human agent to consider while generating the partial transcript. The ASR support module also may provide a low latency initial ASR output for the human agent to consider while generating the partial transcript.

The speech transcription module may be adapted to allow reordering and realigning of keywords in portions of the partial transcription associated with low recognition confidence. The speech transcription module also may include one or more ASR language models that are updated based on the partial transcript prior to performing the automatic speech recognition of the speech signal. There may be an indexing module for associating selected keywords with the recognition output for post-recognition information retrieval operations, and/or a summary module for natural language processing of the partial transcript to develop a narrative summary characterizing the recognition output. In some embodiments, there may be multiple different speech signals representing multiple different speakers.

Embodiments of the present invention also include a speech transcription system for producing a representative transcription text from one or more different audio signals representing one or more different speakers participating in a speech session. A session monitoring module is for user monitoring of the one or more audio signals. A user re-speak module receives a user re-speaking of at least a portion of the speech session. A session ASR module generates a session recognition result corresponding to the one or more audio signals for the speech session. A re-speak ASR module generates a re-speak recognition result corresponding to the user re-speaking. And a session transcription module combines the session recognition result and the re-speak recognition result to develop a final transcription output for the speech session.

In further specific embodiments, the session ASR module may use speaker independent or speaker dependent speech recognition for generating the session recognition result. The system may also include a user review module for user review and correction of the final transcription output. For example, the user review module may automatically highlight lesser reliability portions of the final transcription output for user review and correction. The re-speak ASR may receive human assistance in generating the re-speak recognition result. In some embodiments, there may be multiple different speech signals representing multiple different speakers.

DETAILED DESCRIPTION

Figure 1:
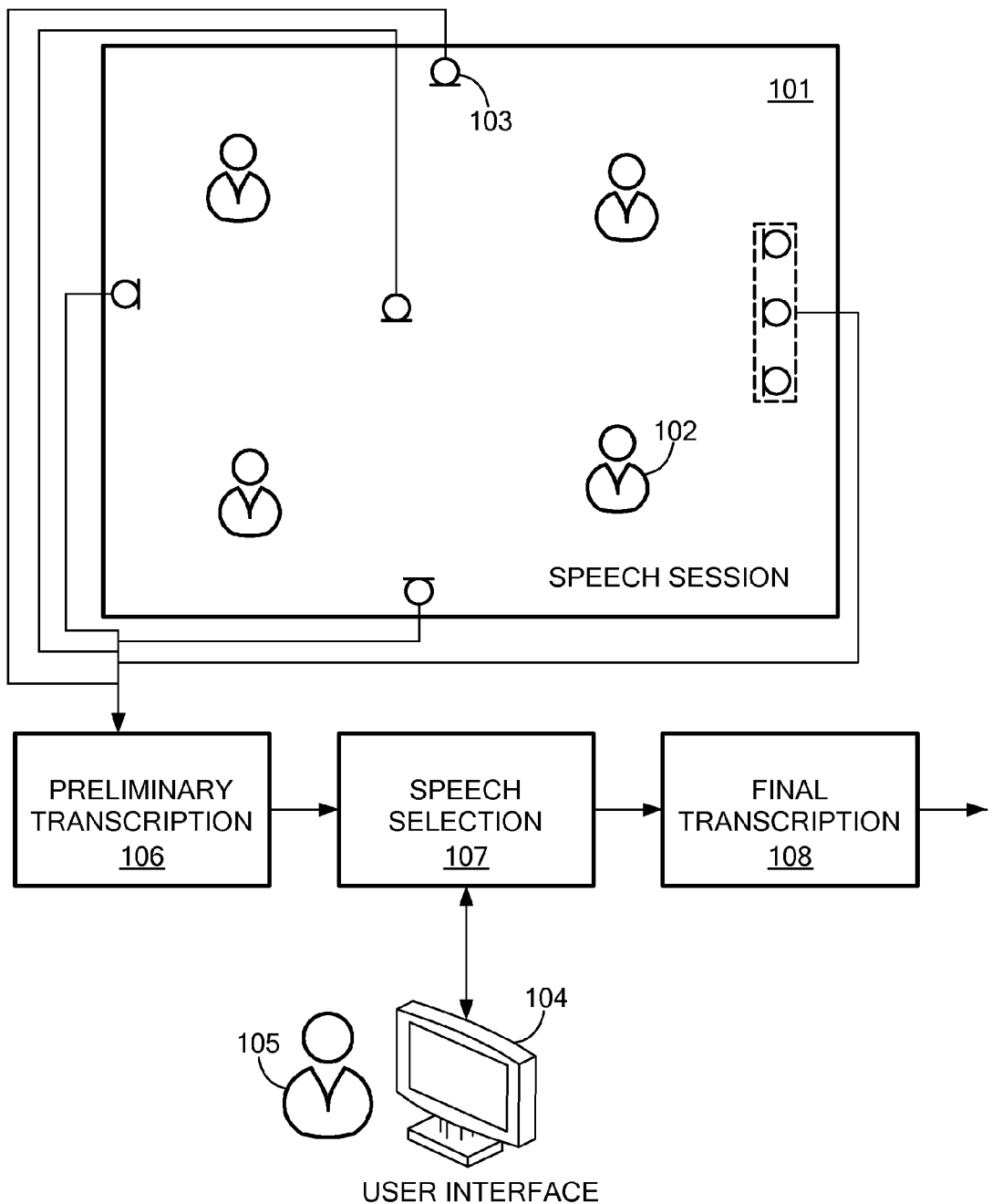
FIG. 1 shows an example of a two service level system for speech session transcription using automatic speech recognition (ASR) according to an embodiment of the present invention.
Figure 2:
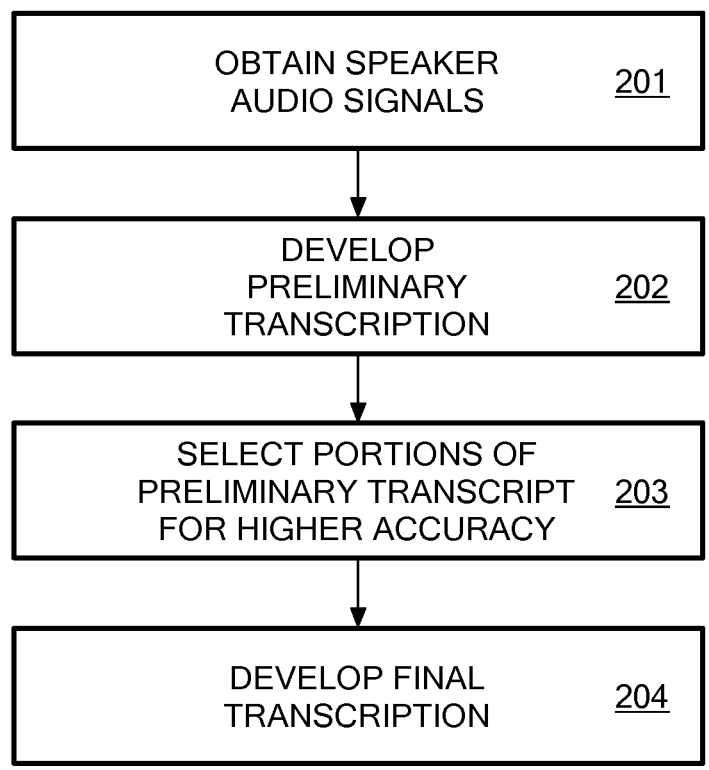
FIG. 2 shows various steps in a transcription method in a system according to FIG. 1.

Embodiments of the present invention are directed to a speech transcription system for producing a representative transcription text from one or more audio signals representing one or more speakers participating in a speech session based on providing two-different levels of transcription service. FIG. 1 shows an example of a two-service level system for speech session transcription using automatic speech recognition (ASR) and FIG. 2 shows various steps in a transcription method according to an embodiment of the present invention. Audio signals from a speech session 101 with one or more speakers 102 are developed by one or more microphones 103 (e.g., from a heterogeneous collection of microphones and/or one or more multi-microphone arrays), step 201, and recorded using one or more recording channels.

A preliminary transcription module 106 develops a preliminary transcription of the speech session, step 202, using automatic speech recognition having a preliminary recognition accuracy performance. This may be a rapid first pass transcription with an initial service level accuracy performance that is relatively low (e.g. 30% word error rate, WER). Operation of the preliminary transcription module 106 may be completely automatic, or it may be supervised by, controlled by and/or manually performed by a human agent 105 using a control interface 106 approximately in real time, which allows the human agent 105 to skip any difficult parts of the speech session.

A speech selection module 107 enables selection of one or more portions of the preliminary transcription that are to receive higher accuracy transcription processing, step 203. The speech selection module 107 may make the user selection based on one more specified selection rules and/or by manual user selection by the human agent 105 with the control interface 104. The control interface 104 typically would be specially designed for its task and may support handling multiple time overlapped signals (i.e., from different speakers 102 and different microphones 103). The speech selection module 107 may also allow a transcriber human agent 105 to "refocus" signal extraction from multiple recorded channels.

A final transcription module 108 is responsive to the user selection for developing a final transcription output for the speech session having a final recognition accuracy performance for the selected one or more portions which is higher than the preliminary transcription target (e.g. 5% WER), step 204. The final transcription module 108 may use manual transcription (by one or more human transcriptionists) or automatic speech recognition for developing the final transcription output. When the final transcription module 108 uses automatic speech recognition, it may specifically use transcription models adapted from information developed by the preliminary transcription module 106, which also may be adapted from one or more different speakers 102.

The specific performance characteristics (e.g., WERs) of the different transcription service levels may be specified as part of a commercial service contract. Embodiments may also store previous interviews from the same customer, in order to adapt speaker dependent acoustic models, speaker-dependent language models (LMs), and domain-specific LMs. In particular, these data can be used after the first pass, using intention recognition techniques to identify previous interviews on similar topics (for training the LM), and to train speaker dependent models for speakers who participate in many speech sessions.

One major problem when applying ASR to speech session transcription is out-of-vocabulary words, and this can be minimized by utilizing a human agent to provide a partial transcription. Thus, embodiments of the present invention also are directed to an accurate semi-automated transcription of a speech session having one or more speakers by utilizing information obtained from a rapid but incomplete human agent transcription. The human agent is instructed to concentrate on content keywords, which would include but not be limited to names, times, and dates. An incomplete partial transcript is produced in real time which is rich in the human-identified keywords. Then, a time alignment of the partial transcript provides anchor points and an automated second ASR pass is performed as constrained by the partial transcript and the anchor points to produce a final transcription output. Such semi-automated transcription arrangements also can allow the user to view the dynamic state of the transcription process and to revise priorities.

Figure 3:
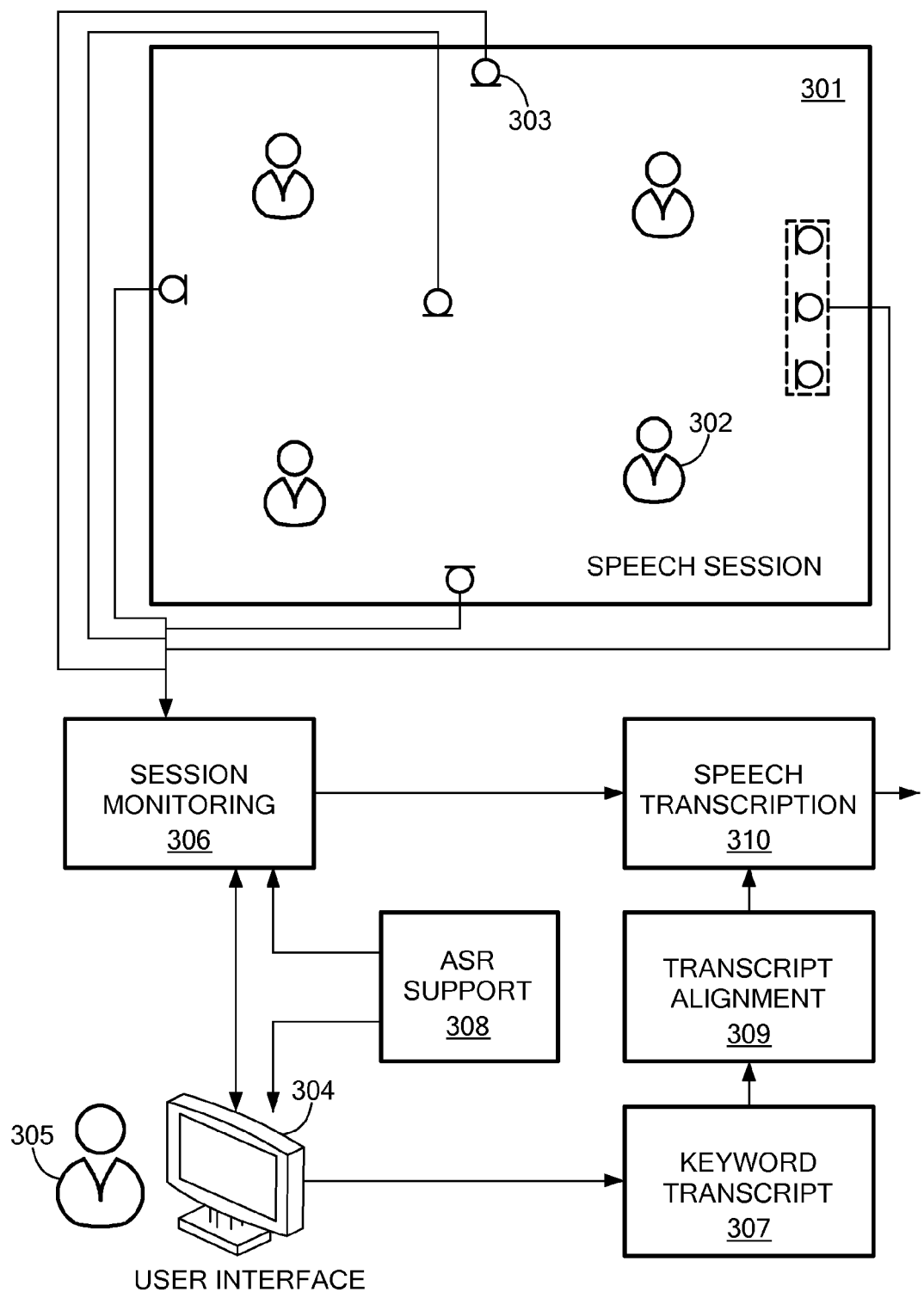
FIG. 3 shows an example of a human agent guided transcription system according to an embodiment of the present invention.
Figure 4:
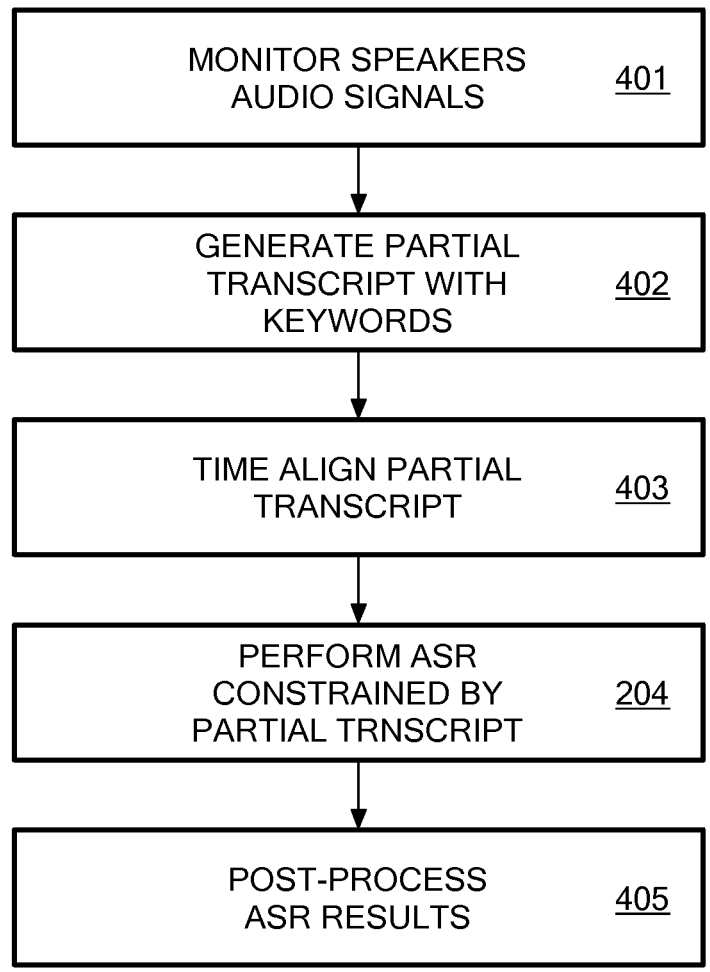
FIG. 4 shows various steps in a transcription method in a transcription system according to FIG. 3.

FIG. 3 shows one example of a human agent guided system for speech transcription using automatic speech recognition (ASR) and FIG. 4 shows various steps in a transcription method according to an embodiment of the present invention. One or more audio signals from a speech session 301 with one or more different speakers 302 are developed by one or more microphones 303 (e.g., from a heterogeneous collection of microphones and/or one or more multi-microphone arrays) and recorded using one or more recording channels.

A session monitoring module 306 allows a human agent 305 to monitor the speaker audio signals, step 401, and their processing with a user interface 304. A keyword transcript module 307 provides for real time processing of the speech signals as monitored and controlled by the human agent 305 to generate a partial transcript of keywords, step 402. This can utilize language model and ASR technologies, for example, an ASR support module 308 that provides ASR processing of the speech signals in real time to support the human agent 305 while generating the partial transcript. Typically, the ASR support module 308 might use one or more language models for predicting likely words in the speech signals for the human agent 305 to consider while generating the partial transcript. The ASR support module 305 also may provide a low latency initial ASR output for the human agent 305 to consider while generating the partial transcript.

A transcript alignment module 309 then time aligns the partial transcript with the speech signals to generate time based anchor points, step 403. Since the human agent 305 will enter or accept a keyword at approximately the same time as they hear the word in the speech signals, this timing information is recorded while generating the partial transcript. The transcript alignment module 309 may also use models of the words from the partial transcript and/or a general speech model to align the audio in the speech signals to the partial transcript. In poor audio conditions, it may be necessary for the human agent 305 to hear some additional context in order to provide an accurate partial transcript of some speech segments. Under such circumstances the keywords provided by the human agent 305 may not be in strict time order, and the transcript alignment module 309 should be able to cope with this. For example, if a high confidence alignment cannot be found, the transcript alignment module 309 may perturb the keywords in low confidence regions and re-align.

Speech transcription module 310 performs automatic speech recognition of the speech signals as constrained by the time aligned partial transcript, step 404 to produce a final transcription output containing the keywords. The speech transcription module 130 may be adapted to allow reordering and realigning of keywords in portions of the partial transcription associated with low recognition confidence. The speech transcription module 130 also may include one or more ASR language models that are updated based on the partial transcript prior to performing the automatic speech recognition of the speech signals.

Before the speech transcription module 310 performs automatic speech recognition of the speech signals, the partial transcript may be used to update the ASR language model, thereby improving the ASR accuracy and including previously OOV words. For example, this can be achieved via interpolation or LM adaptation. In addition, the speech transcription module 310 can run the ASR in a number of different modes:

Include the keywords provided by the human agent 305 in the recognition network and run standard ASR to generate a recognition lattice. Then prune the lattice to force the keywords to occur on the best path (i.e., force the keywords to be the only recognition option) and recompute the best path.

Include the keywords provided by the human agent 305 in the recognition network and run standard ASR to generate a recognition lattice. Then augment the lattice by adding links and nodes as necessary to ensure that the keywords occur at the appropriate times. Then prune the lattice to force the keywords to occur on the best path (i.e., force the keywords to be the only recognition option) and recompute the best path.

Use the timings provided by the alignment phase to constrain the recognition network to ensure only the keyword will be considered during hypotheses generation. This will guarantee that the partial transcript will be included in the final transcription output.

Embodiments such as the one shown in FIG. 3 may further provide for some additional post-processing of the keyword enriched recognition output from the speech transcription module 310, step 405. For example, there may be an indexing module for associating selected keywords with the final transcription output for post-recognition information retrieval operations, and/or a summary module for natural language processing of the partial transcript to develop a narrative summary characterizing the recognition output.

It is anticipated that only a relatively small percentage of the words in the final transcription output will have been provided by the human agent 305, perhaps 20%-30%. That is because the human agent 305 will get to hear the session audio only once, in real-time, and so will not be able to transcribe all the words. This is reflected by considered an example such as the following, where the actual conversation is:

"This is John, let's start the meeting, who is on the line?"
"Hi this is Fred Smith. Hello this is Lydia Brown. Hi this is Salma Sanchez. Hello it's Marcus Lynch."
"Okay, seems everyone is here. I called this meeting to discuss the In-Vivo
Technologies project and the teleradiology deliverables . . . . "

A real time partial transcription is supervised by the human agent 305, with particular attention to content keywords might be:

"John meeting Fred Lydia Salma Marcus discuss In-Vivo Technologies teleradiology"

This partial transcript contains only 10 out of 50 words, but crucially these are content keywords that might be out-of-vocabulary for the ASR system.

The partial transcript of keywords may also be used for information retrieval purposes—because the human agent 305 focuses on content keywords, the partial transcript will be similar to a keyword summary, and can be used as such, for example, in combination with the final transcription output to provide an index for spoken document retrieval. The alignment of partial keyword transcription 309 may also be used without further ASR processing to provide an index for spoken document retrieval. Further processing of the partial transcript with NLU technologies could be targeted at producing a readable summarization that could be stored along with the original audio and final output transcription, providing multiple retrieval options dependent on the user requirements.

Typically, human agents are used to correct ASR output, but prior art arrangement fail to describe or suggest using human agents to guide ASR to produce a transcription of a speech session. Embodiments of the present invention significantly reduce the cost of using a human agent by allowing the human agent to listen to the audio only once, and then augmenting the partial transcript output of the agent using ASR.

Embodiments of the present invention also include arrangements for speech transcription of one or more audio signals from one or more unknown speakers by combining ASR on the original recording and then re-speaking portions with a known speaker. This re-spoken speech is recorded, ASR is then applied to the original audio recording using speaker independent (SI) models, and on the re-spoken recording using speaker dependent (SD) models (adapted to the known speaker). The outputs of each of the ASR processes are then combined to produce the final transcription output. Re-speaking is routinely used for such online ASR tasks as TV subtitle generation, and also for offline subtitle generation, but embodiments of the present invention uniquely combine ASR recognition output from the original speech session audio and from re-spoken audio to guide correction by a human agent.

Figure 5:
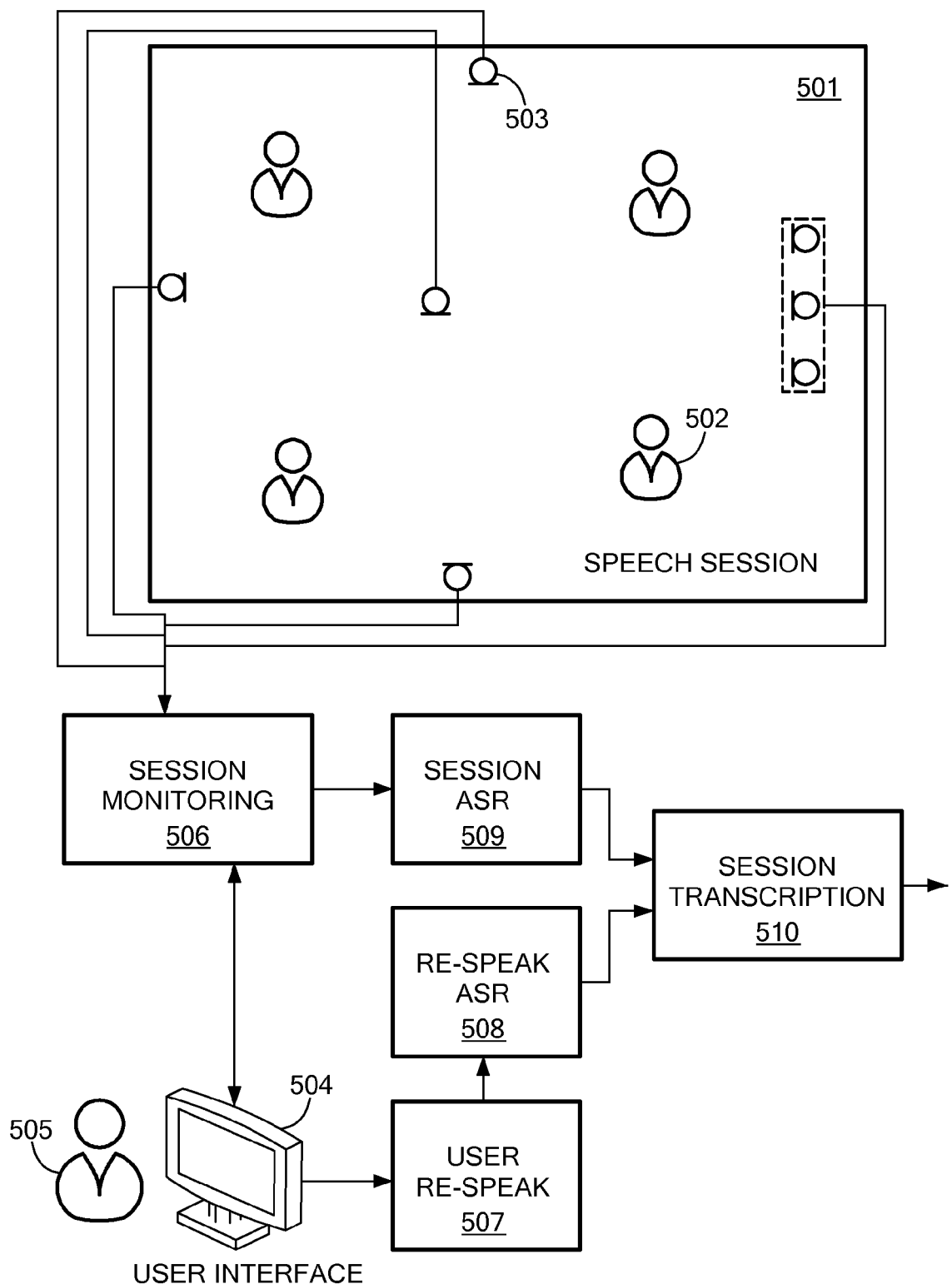
FIG. 5 shows an example of a multi-speaker transcription system according to an embodiment of the present invention.
Figure 6:
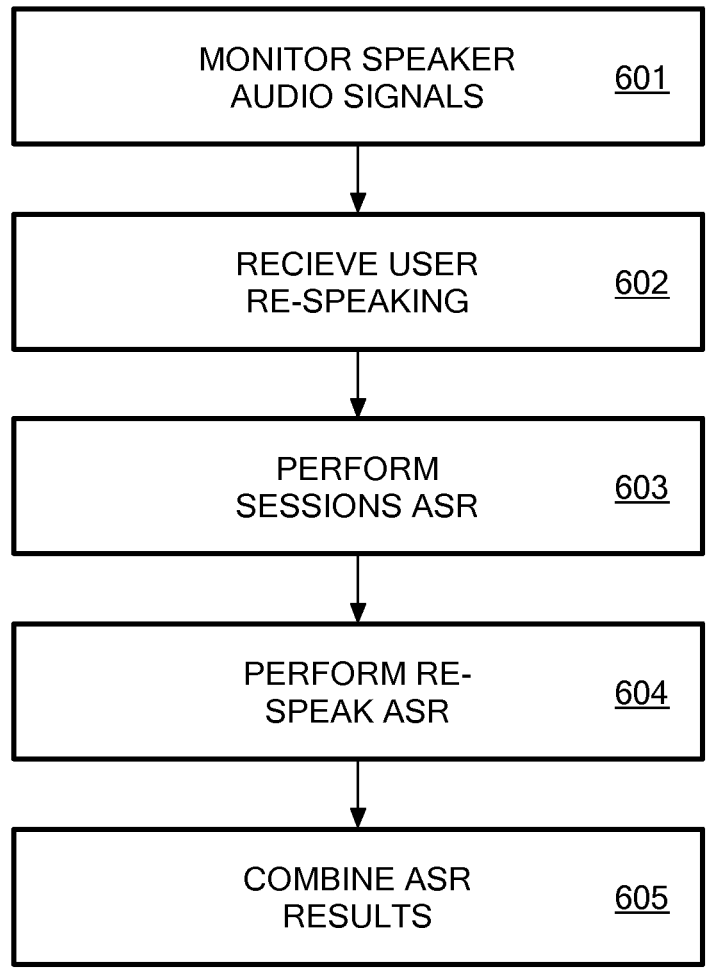
FIG. 6 shows various steps in a transcription method in a transcription system according to FIG. 5.

FIG. 5 shows an example of a re-speak transcription system according to an embodiment of the present invention, and FIG. 6 shows various steps in a transcription method in a transcription system according to FIG. 5. A session monitoring module 506 is provided for monitoring of one or more audio signals by a human agent 505 having a user interface 504. A user re-speak module 507 receives a re-speaking of one or more portions of the speech session 501 by the human agent 505, step 602. A session ASR module 509 uses speaker dependent and/or speaker independent AST to generate a session recognition result corresponding to the audio signals for the speech session 501, step 603. A re-speak ASR module 508 generates a re-speak recognition result corresponding to the user re-speaking, step 604; in some embodiments, the human agent 505 may provide assistance with this step. And a session transcription module 510 combines the session recognition result and the re-speak recognition result to develop a final transcription of the speech session, step 605; for example, based on word confidences and/or a priori confidences.

The system may also include a user review module for review and correction of the final transcription output by the human agent 505 via the user interface 504. For example, a user review module may automatically highlight lesser reliability portions of the final transcription output for review and correction by the human agent 505.

Where very high accuracy is required, the final transcription output can be checked and corrected by the human agent 505. Recognition confidences can be used to guide this correction process—the regions where the SI and SD ASR agree are most likely to be correct, whereas the regions where both the SI and SD ASR have low confidence are most likely to be incorrect.

To further improve the recognition accuracy, the SD ASR output can be used to help the human agent 505 produce a partial transcript of keywords. The human agent 505 can listen to the re-spoken audio recording in real time, and accept the re-speak ASR results, or revise and enter new words where necessary. The human agent 505 need not produce a complete transcription, but rather can focus on content keywords, such as names, times, dates etc.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A speech transcription system for producing a representative transcription text from one or more audio signals representing one or more speakers participating in a speech session, the system comprising:

a preliminary transcription module for developing a preliminary transcription of the speech session using automatic speech recognition having a preliminary recognition accuracy performance;

a speech selection module for user selection of one or more portions of the preliminary transcription to receive higher accuracy transcription processing; and a final transcription module responsive to the user selection for developing a final transcription output for the speech session having a final recognition accuracy performance for the selected one or more portions which is higher than the preliminary recognition accuracy performance.

2. The system according to claim 1, wherein the preliminary transcription module develops the preliminary transcription automatically.

3. The system according to claim 1, wherein the preliminary transcription module develops the preliminary transcription with human assistance.

4. The system according to claim 1, wherein the speech selection module makes the user selection based on one more specified selection rules.

5. The system according to claim 1, wherein the speech selection module makes the user selection by manual user selection.

6. The system according to claim 1, wherein the final transcription module develops the final transcription output using manual transcription.

7. The system according to claim 1, wherein the final transcription module develops the final transcription output using automatic speech recognition.

8. The system according to claim 7, wherein the final transcription module uses transcription models adapted from information developed by the preliminary transcription module.

9. The system according to claim 7, wherein the final transcription module uses transcription modules adapted from one or more different speakers.

10. The system according to claim 1, wherein there are a plurality of different audio signals representing a plurality of different speakers participating in the speech session.

* * * * *